(12) United States Patent
Iyer et al.

(10) Patent No.: US 10,334,438 B2
(45) Date of Patent: Jun. 25, 2019

(54) SYSTEM AND METHOD FOR CREATING AND MANAGING WIRELESS NETWORKS

(71) Applicant: ANI Technologies Private Limited, Bangalore, Karnataka (IN)

(72) Inventors: Sriram V Iyer, Bangalore (IN); Ankit Bhati, Koramangla (IN); Vasuki K Setlur, Bangalore (IN); Nagamani Raajan, Tamilnadu (IN)

(73) Assignee: ANI Technologies Private Limited, Bangalore, Karnataka (IN)

( * ) Notice: Subject to any disclaimer, the term of this patent is extended or adjusted under 35 U.S.C. 154(b) by 0 days.

(21) Appl. No.: 15/627,152

(22) Filed: Jun. 19, 2017

(65) Prior Publication Data

US 2017/0366971 A1 Dec. 21, 2017

(30) Foreign Application Priority Data

Jun. 21, 2016 (IN) .............................. 201641021213

(51) Int. Cl.
| | |
|---|---|
| *H04W 12/06* | (2009.01) |
| *H04W 4/02* | (2018.01) |
| *H04W 16/16* | (2009.01) |
| *H04W 8/24* | (2009.01) |
| *H04L 29/06* | (2006.01) |
| *H04W 84/12* | (2009.01) |

(52) U.S. Cl.
CPC ........... *H04W 12/06* (2013.01); *H04L 63/083* (2013.01); *H04L 63/0876* (2013.01); *H04W 4/023* (2013.01); *H04W 8/24* (2013.01); *H04W 16/16* (2013.01); *H04W 84/12* (2013.01)

(58) Field of Classification Search
CPC ..... H04W 84/12; H04W 48/18; H04W 48/16; H04W 84/18; H04M 2250/06; H04M 1/737

See application file for complete search history.

(56) References Cited

U.S. PATENT DOCUMENTS

| | | | |
|---|---|---|---|
| 8,627,420 B2 | 1/2014 | Furlan et al. | |
| 9,078,200 B2 | 7/2015 | Wuergler et al. | |
| 9,264,905 B2 | 2/2016 | Ferguson-Jarnes et al. | |
| 2008/0052384 A1* | 2/2008 | Marl ................... | H04L 12/2807 709/223 |

(Continued)

FOREIGN PATENT DOCUMENTS

WO 2016127138 A1 8/2016

*Primary Examiner* — Quan M Hua
(74) *Attorney, Agent, or Firm* — Goldberg Segalla LLP (57) ABSTRACT

A system includes user device, first and second communication devices, and a server. The user device transmits a first device identifier associated to the server. The server generates and stores a first wireless network identifier and a first password corresponding to the first device identifier. The server transmits the first wireless network identifier and first password to the first communication device. The first communication device creates a wireless network, which is accessed by the user device using the first wireless network identifier and first password. Further, the user device transmits the first device identifier to the server. The second communication device receives the first wireless network identifier and first password from the server. The second communication device creates the wireless network, which is automatically accessed by the user device.

7 Claims, 4 Drawing Sheets

(56) References Cited

U.S. PATENT DOCUMENTS

| | | | |
|---|---|---|---|
| 2014/0165094 A1* | 6/2014 | Hardy | H04N 21/25841 725/34 |
| 2014/0244723 A1* | 8/2014 | Gong | H04L 9/3215 709/203 |
| 2015/0024688 A1 | 1/2015 | Hrabak et al. | |
| 2017/0150362 A1* | 5/2017 | Clemenson | H04L 41/0806 |

* cited by examiner

SYSTEM AND METHOD FOR CREATING AND MANAGING WIRELESS NETWORKS

CROSS-RELATED APPLICATIONS

This application claims priority of Indian Application Serial No. 201641021213, filed Jun. 21, 2016, the contents of which are incorporated herein by reference.

FIELD OF THE INVENTION

The present invention relates generally to wireless networks, and more particularly to creating and managing multiple wireless networks in shared resource environments.

BACKGROUND

In today's connected world, it is extremely important to have continuous access to the Internet. The Internet and assistance that the Internet provides have become an integral necessity of daily lives. Thus, it is essential to be connected to the Internet even while travelling to have an uninterrupted access to the assistance that the Internet provides. Commercial vehicles provide Internet access by way of wireless networks to users in transit. The users book the commercial vehicles for commuting to and from workplaces daily and thus the Internet access is an important value added service provided by the commercial vehicles. With the advancement in the field of wireless networks, it has become possible for handheld devices and laptop computers, carried by the users, to connect to the Internet while the users are in transit. Examples of handheld devices include mobile and/or cellular phones, tablets, personal digital assistants (PDAs), and the like. Examples of the wireless networks include Wi-Fi networks, Bluetooth networks, ZigBee networks, and the like. Typically, the wireless networks are created by access points. The access points function as gateways to the Internet. Thus, the access points are mediators between the handheld devices and the Internet. The access points are configured to receive access requests from the handheld devices, authenticate the handheld devices, and provide access of the Internet to the handheld devices. Examples of the access points include routers, LAN controllers, Universal Serial Bus (USB) dongles, and the like. Alternatively, mobile phones and tablets may also function as the access points by creating the Wi-Fi hotspots that are accessed by the handheld devices. Examples of the commercial vehicles include a taxi, a cab, a bus, fleet vehicles, and the like.

Typically, the users while travelling on the commercial vehicles (for instance, the taxi or the cab) connect to the Internet via the access points available in the commercial vehicles. Each commercial vehicle includes at least one of a wireless router, the mobile phone, and USB dongles that function as the access point and create the Wi-Fi hotspots. Each Wi-Fi hotspot created in the commercial vehicle has a Service Set Identifier (SSID) and a password. The SSID and password are inputted by the user in the handheld device to connect with the Wi-Fi hotspot and access the Internet. Generally, the chauffer of the commercial vehicle is aware of the SSID and the password of the Wi-Fi hotspot. The chauffer communicates the SSID and the password of the Wi-Fi hotspot to the user. The SSID and the password are specific to the Wi-Fi hotspot of the commercial vehicle. Thus, each commercial vehicle with the Wi-Fi hotspot has a different SSID and password. As the user travels in different commercial vehicles, the user has to re-connect to the Wi-Fi hotspot with different SSIDs and enter the corresponding passwords each time. The re-connection to different Wi-Fi hotspot is a tedious and time-consuming process. Additionally, as the password for the Wi-Fi hotspot is known to the chauffer of the commercial vehicle and the user, there are security risks involved with the use of the Wi-Fi hotspot. For example, the chauffer may himself misuse the Wi-Fi hotspot or access user data stored in the handheld device of the user. The user data includes personal, professional, and financial information of the user. Furthermore, the use of Wi-Fi hotspots cannot be regulated, as the chauffer controls the Wi-Fi hotspot and there is no track of historical and current usage of the Wi-Fi hotspots.

To solve the aforementioned drawbacks, the Wi-Fi hotspot in the commercial vehicles is made accessible to each user with different password. When the user enters the commercial vehicle and connects with the Wi-Fi hotspot by way of the handheld device, a one-time password is generated by a backend server and sent to the handheld device. Thus, every time the user re-connects with the Wi-Fi hotspot, a new one-time password is generated by the backend server and transmitted to the handheld device. The access point authenticates the handheld device based on the one-time password and provides the access of the Internet to the handheld device. Thus, the chauffer and the user are not aware of the password of the Wi-Fi hotspot as the password changes for every session initiated by the user. However, there is a need to re-enter the passwords every time the user connects with the Wi-Fi hotspot. Also, the backend server is required to generate multiple passwords for same user every time the user connects with the Wi-Fi hotspot. Furthermore, the user needs to interact with a web-page that assists the user in generating the one-time password. The web-page may request the user to input his/her name, telephone number, email ID, and the like. The web-page may also display a non-skippable advertisement to the user before generating the one-time password. Thus, the user is required to interact with the web-page every time the user connects with the Wi-Fi hotspot which is extremely tedious and time consuming. Additionally, there are delays involved in receiving the one-time password by the handheld devices thereby hampering connectivity and accessibility to the Internet.

Thus, there is a need for a system that provides a seamless access to the wireless networks and effectively manages the wireless networks in shared resources environments.

SUMMARY

In an embodiment of the present invention, a method for creating a wireless network, such as a Wi-Fi network and a Bluetooth network, is provided. A first wireless network identifier is associated with a first device identifier and received by a first communication device. A first password is also received by the first communication device. The first password is associated with at least one of the first wireless network identifier and the first device identifier. The wireless network is created by the first communication device. The user device connects to the wireless network using the first wireless network identifier and the first password.

In another embodiment of the present invention a method for creating a wireless network, such as a Wi-Fi network or a Bluetooth network, is provided. A server receives a first device identifier from a user device. The first device identifier is associated with the user device. The server generates a first wireless network identifier, such as a Wi-Fi network service set identifier (SSID), and a first password based on the first device identifier. The server transmits the first wireless network identifier and the first password to the first communication device and the user device. The server instructs the first communication device to create the wireless network. Finally, the user device connects to the wireless network using the first wireless network identifier and the first password.

Various embodiments of the present invention provide a system for creating a wireless network. The system includes first and second communication devices and a server. Examples of the wireless network are Wi-Fi networks and Bluetooth networks. The first and second communication devices are placed in first and second commercial vehicles. The server receives a first device identifier from a user device when a user of the user device boards the first commercial vehicle. The first device identifier is a unique credential associated with the user device. The server generates and stores a first wireless network identifier and a first password associated with the first device identifier. The first communication device of the first commercial vehicle receives the first wireless network identifier and the first password from the server. The first communication device creates the wireless network. The user device connects to the wireless network using the first wireless network identifier and the first password. The user device stores the first wireless network identifier and the first password in a memory thereof. Further, the user device sends the first device identifier to the server when the user of the user device boards the second commercial vehicle. The server retrieves and transmits the first wireless network identifier and the first password to the second communication device. The second communication device creates the wireless network which is accessed using the first wireless network identifier and the first password. Since the user device stores the first wireless network identifier and the first password in the memory, the user device may seamlessly access the wireless network without re-entering the first password to connect to the wireless network creates by the second communication device.

BRIEF DESCRIPTION OF DRAWINGS

The following detailed description of the preferred embodiments of the present invention will be better understood when read in conjunction with the appended drawings. The present invention is illustrated by way of example, and not limited by the accompanying figures, in which like references indicate similar elements.

DETAILED DESCRIPTION

The detailed description of the appended drawings is intended as a description of the currently preferred embodiments of the present invention, and is not intended to represent the only form in which the present invention may be practised. It is to be understood that the same or equivalent functions may be accomplished by different embodiments that are intended to be encompassed within the spirit and scope of the present invention.

As used in the specification and claims, the singular forms "a", "an" and "the" include plural references unless the context clearly dictates otherwise. For example, the term "an article" may include a plurality of articles unless the context clearly dictates otherwise.

Those with ordinary skill in the art will appreciate that the elements in the figures are illustrated for simplicity and clarity and are not necessarily drawn to scale. For example, the dimensions of some of the elements in the figures may be exaggerated, relative to other elements, in order to improve the understanding of the present invention.

There may be additional components described in the foregoing application that are not depicted on one of the described drawings. In the event, such a component is described, but not depicted in a drawing, the absence of such a drawing should not be considered as an omission of such a design from the specification.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

Figure 1:
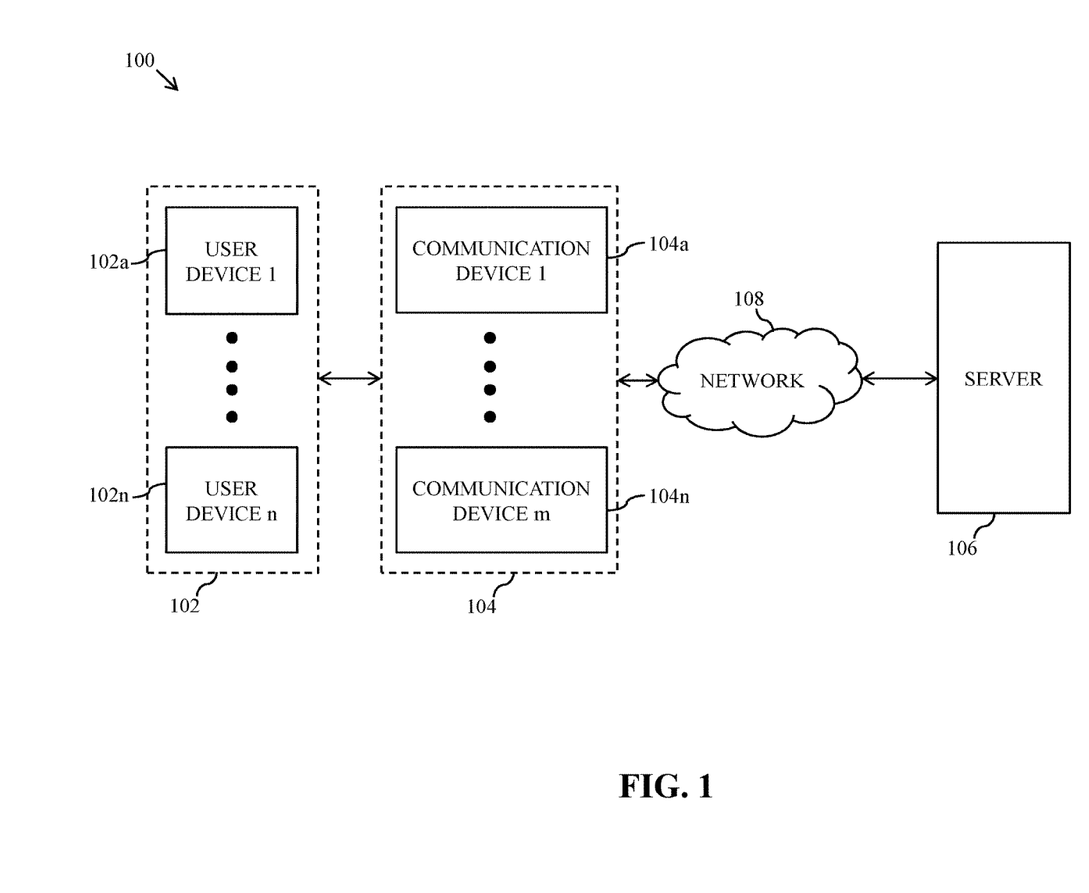
FIG. 1 illustrates a schematic block diagram of a system for creating a wireless network, in accordance with an embodiment of the present invention.

Referring now to FIG. 1, a schematic block diagram of a system 100 for creating a wireless network, in accordance with an embodiment of the present invention, is shown. Examples of the wireless network include Wi-Fi networks, Bluetooth networks, ZigBee networks, and the like. The system 100 includes multiple user devices 102a-102n (also referred to as 'a set of user devices 102a-102n'), multiple communication devices 104a-104m (also referred to as 'a set of communication devices 104a-104m'), and a server 106. Examples of the user devices 102 include mobile phones, tablets, personal digital assistants (PDAs), laptops, phablets, and the like. The communication devices 104 are connected to the server 106 by way of a network 108. Examples of the communication devices 104 include Wi-Fi routers, hubs, gateways, LAN controllers, Universal Serial Bus (USB) dongles, and the like. Alternatively, the mobile phones and tablets may also function as the communication devices 104 by creating the Wi-Fi network that is accessed by user devices 102. Examples of the network 108 include Local Area Network (LAN), Wide Area Network (WAN), wireless LAN (WLAN), cellular networks, IP networks, and the like.

The system 100 may be deployed in multiple commercial vehicles such as taxis, cabs, buses, trains, flights, freight carriers, and the like to provide network access, such as Internet access, to the users in transit. Additionally, the system 100 may be deployed in private workspaces, commercial office spaces, shared office spaces, club houses, hospitals, private residences, gymnasiums, social gatherings, restaurants, coffee shops, and the like.

The user devices 102a-102n are typically handheld devices that wirelessly connect with the communication devices 104. Each user device 102 is owned by a corresponding user. Each user device 102 includes a wireless communication module (not shown) that enables the user device 102 to connect wirelessly with the communication device 104 and access the Internet. The wireless communication module connects with available wireless networks, created by the communication devices 104, in vicinity of the user device 102. For instance, the user device 102 connects with the Wi-Fi network created by the communication device 104 when the user device 102 is in the vicinity of the communication device 104. The Wi-Fi network is created by the communication device 104 that functions as gateway to the Internet. In the preferred embodiment, the user device 102 is the mobile phone 102 of the user. The mobile phones 102 are configured to connect with the Wi-Fi network and the cellular network. Further, each mobile phone 102 has a device identifier associated with it. Examples of the device identifier include an international mobile equipment identity (IMEI) number, a unique device identifier (UDID), a unique device name, a unique device number, and the like. Additionally, cellular network providers assign a cell phone number to the mobile phone 102. The cell phone number of the mobile phone 102 may also be used as the device identifier of the mobile phone 102. Moreover, as the mobile phone 102 is owned by the user, unique name, email ID, social security number, passport number, and the like, of the user may also be used as the device identifier. Further, each of the user devices 102 also includes a memory (not shown). When the user device 102 connects to the Wi-Fi network, the user device 102 stores a Service Set Identifier (SSID) and a password of the Wi-Fi network in the memory as a saved network. If the SSID and password of the Wi-Fi network are stored in the memory, the user device 102 automatically connects to the Wi-Fi network without user's intervention. In an alternate embodiment, each user device 102 includes a global positioning system (GPS) unit (not shown). The GPS unit tracks location of the user device 102 and generates location data corresponding to the user device 102. The location of the user device 102 may alternatively be tracked by using base stations of the cellular networks.

The communication devices 104 function as gateways between the user devices 102 and the Internet. The communication devices 104 create the wireless networks based on instructions received from the server 106. The communication devices 104 are configured to receive network access requests from the user devices 102, authenticate the user devices 102 based on passwords, and provide access to the Internet to the user devices 102. Examples of the communication devices 104 include routers, LAN controllers, universal serial bus (USB) dongles, and the like. In the preferred embodiment, the set of communication devices 104a-104m are located in various taxis. Each taxi includes one communication device 104 which creates the Wi-Fi network accessible by the users seated in the taxi. Typically, the communication device 104 is a mobile phone placed in the taxi that creates the W-Fi network accessible by the user. It is well known to the person skilled in the art that mobile phones may be used to create the Wi-Fi networks (also referred to as Wi-Fi hotspots). Further, the communication device 104 is configured to create multiple Wi-Fi networks each with different wireless network identifier and password in the taxi. The wireless network identifiers of the Wi-Fi network are the Service Set Identifiers (SSIDs). The communication device 104 creates a unique Wi-Fi network for the user boarding the taxi. As the communication device 104 creates unique Wi-Fi network every time a different user boards the taxi, the communication device 104 is shared by multiple users to access the Internet. Thus, the system 100 is a shared resource environment in which each communication device 104 is shared by multiple user devices 102. In an alternate embodiment, each communication device 104 includes a GPS unit (not shown). The GPS unit of the communication device 104 tracks location of the taxi and generates location data corresponding to the communication device 104.

The communication devices 104a-104m are connected to the server 106 by way of the network 108. The server 106 includes a database that stores a set of wireless network identifiers, a set of passwords, and a set of device identifiers. The set of device identifiers correspond to the set of user devices 102a-102n. Further, the set of wireless network identifiers and set of passwords correspond to the set of device identifiers. In the preferred embodiment, the server 106 generates and stores a wireless network identifier and a password for each device identifier in the set of device identifiers. Since, each device identifier corresponds to one user device 102 and each user device 102 is owned by the corresponding user, the wireless network identifiers and the passwords correspond to the users. Further, the server 106 is configured to send the instructions to the communication devices 104a-104m for creating a Wi-Fi network with a specific wireless network identifier and password. The server 106 also periodically receives location data of the communication devices 104a-104m and the user devices 102a-102n. In an embodiment, the server 106 receives device identifier of the user device 102 by way of the cellular network. When the server 106 receives the device identifier of the user device 102, the server 106 transmits network configuration information to the communication device 104. The network configuration information includes the wireless network identifier and password that enables the communication device 104 to create the Wi-Fi network in the taxi.

In operation, a first communication device 104a is placed in a first taxi. A user device 102a includes a software application that facilitates booking of the first taxi. For instance, the software application is a taxi booking application that enables user to book the first taxi from multiple available taxis. The taxi booking application facilitates creation of a first account of the user of the user device 102a. The first account includes first device identifier of the user device 102a, service preferences of the user of the user device 102a, payment details of the user of the user device 102a, and the like. The taxi booking application stores the account of the user of the user device 102a in the server 106. Additionally, the taxi booking application may access location information of the user device 102a generated by a GPS unit of the user device 102a. The location information of the user device 102a allows the server 106 to identify available taxis near the user device 102a. Further, the user device 102a transmits a first booking request for the first taxi by way of the taxi booking application to the server 106. The taxi booking application uses the cellular network to transmit the first booking request and location data of the user device 102a to the server 106.

The server 106 transmits the location data of the user device 102a and the first booking request to the first communication device 104a. The first communication device 104a displays location of the user device 102a to a chauffeur of the first taxi. The chauffeur of the first taxi approaches the location of the user device 102a. The server 106 periodically receives location of the first communication device 104a, as the first taxi approaches the location of the user device 102a. When the first taxi arrives at the location of the user device 102a, the user of the user device 102a boards the first taxi. The user device 102a transmits a Wi-Fi network access request to the server 106 or a trigger, such as an initiation of the trip by the chauffer. The Wi-Fi network access request includes the first device identifier of the user device 102a.

Further, the server 106 receives the Wi-Fi network access request and detects that the user device 102a has booked the first taxi. The server 106 compares the first device identifier with each device identifier in the set of device identifiers. When the first device identifier does not match with any device identifier in the set of device identifiers, the server 106 stores the first device identifier in the set of device identifiers. Further, the server 106 generates and stores a first wireless network identifier and a first password corresponding to the first device identifier. Further, the server 106 transmits the network configuration information that includes first wireless network identifier and the first password to the first communication device 104a and the user device 102a. Finally, the first communication device 104a creates a Wi-Fi network using the first wireless network identifier as the SSID and the first password as access password. The user device 102a connects with the Wi-Fi network created by the first communication device 104a using the first wireless network identifier and the first password and access the Internet. The user device 102a stores the first wireless network identifier and the first password in its memory as a saved network.

Further, the user device 102a may send a second booking request for booking a second taxi by way of the taxi booking application. The second taxi, which includes a second communication device 104b, receives the second booking request and approaches the location of the user device 102a. When the second taxi confirms the second booking request, the server 106 receives the first device identifier from the user device 102a. The server 106 retrieves the first wireless network identifier and the first password associated with the user device 102a. Further, the server 106 transmits the first wireless network identifier and the first password to the second communication device 104b. The second communication device 104b creates the Wi-Fi network with the first wireless network identifier as the SSID and the first password as the access password. As the first wireless network identifier and the first password are stored in the memory of the user device 102a, the user device 102a automatically connects with the Wi-Fi network created by the second communication device 104b.

A person skilled in the art would appreciate that the invention facilitates creation of the Wi-Fi network that is specific to a second user device 102b, when a second user with the second user device 102b sends a booking request for booking the same taxi and the taxi is allocated to the second user device 102b. The second user device 102b is owned by the second user. In other words, the invention facilitates seamless creation and management of the Wi-Fi networks, which have SSIDs and passwords specific to the user devices and change dynamically based on the user device requesting the taxi.

Figure 2:
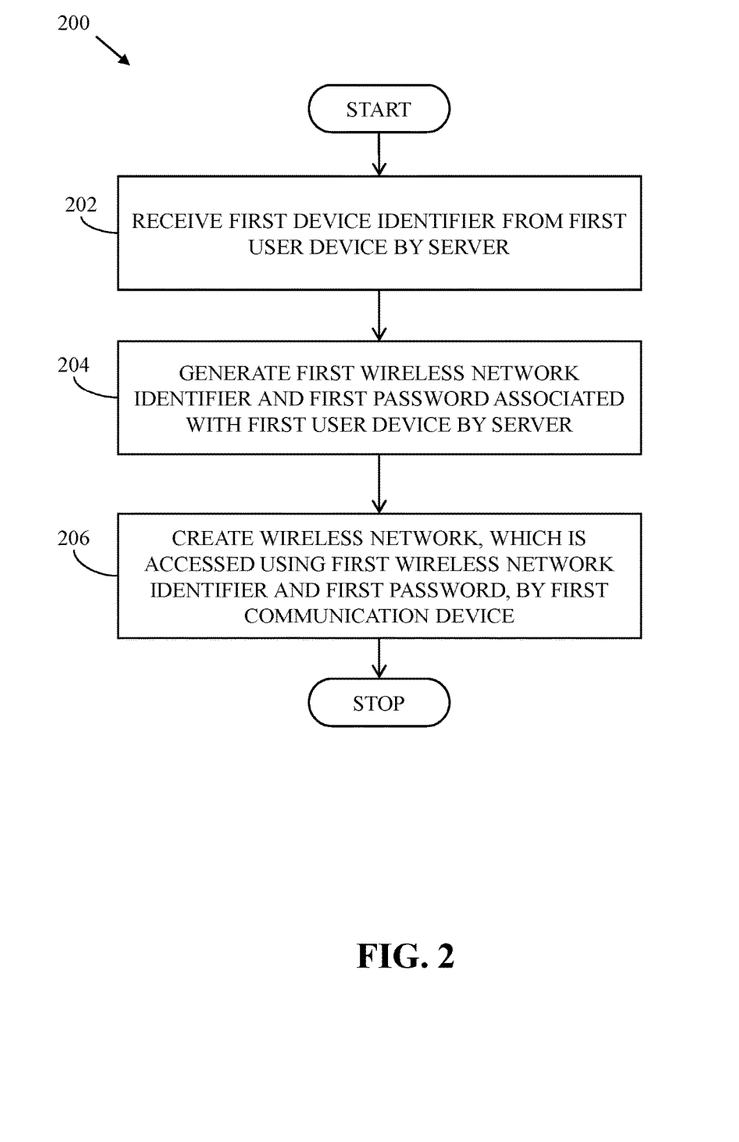
FIG. 2 illustrates is a flow chart to illustrate a method for creating the wireless network, in accordance with an embodiment of the present invention.

Referring now to FIG. 2, a flow chart illustrating a method 200 for creating a wireless network in accordance with an embodiment of the present invention is shown. At step 202, the server 106 receives the first device identifier from the user device 102a. At step 204, server 106 generates the first wireless network identifier and the first password associated with the user device 102a. At step 206, the first communication device 104a creates the wireless network, which is accessed by the first user device 102a using the first wireless network identifier and the first password.

Figure 3:
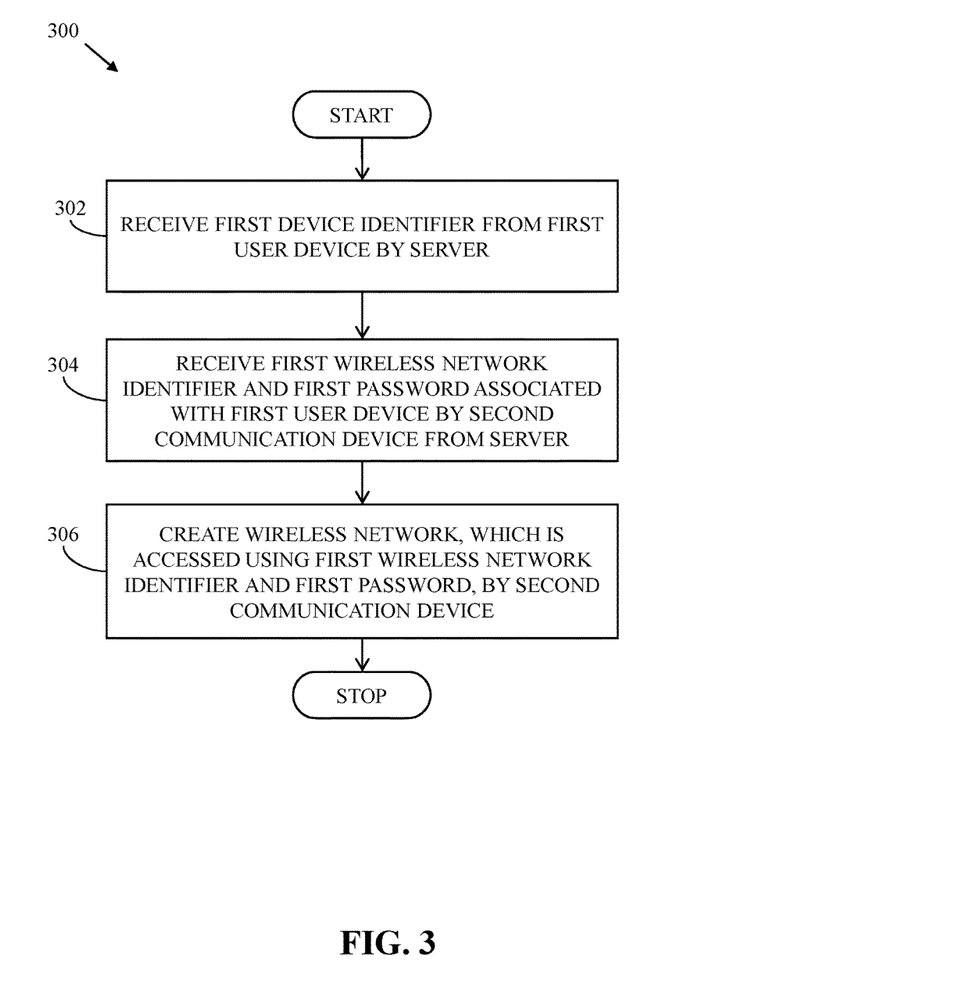
FIG. 3 illustrates is a flow chart to illustrate a method for re-connecting to the wireless network, in accordance with an embodiment of the present invention.

Referring now to FIG. 3, a flow chart illustrating a method 300 for re-connecting to the wireless network in accordance with an embodiment of the present invention is shown. At step 302, the server 106 receives the first device identifier from the user device 102a. At step 304, the second communication device 104b receives the first wireless network identifier and the first password associated with user device 102a from the server 106. At step 306, the second communication device 104b creates the wireless network, which is accessed by the user device 102a using the first wireless network identifier and the first password.

In an alternate embodiment, the communication devices 104 create the Wi-Fi network for the user devices 102 when the user devices 102 are within a threshold distance of the communication devices 104. The locations of user devices 102 and the first communication devices 104 are received by the server 106 from their respective GPS units. When the server 106 determines that the user device 102 is within the threshold distance of the communication device 104, the server 106 transmits the network configuration information to the communication device 104. The network configuration information enables the communication device 104 to create the Wi-Fi network in the taxi. The threshold distance depends on range of the Wi-Fi network created by the communication device 104. For instance, if the range of the Wi-Fi network created by the communication device 104 is 50 meters, the threshold distance may be set to 5 meters. It is to be noted that threshold distance of each communication device in the set of communication device 104a-104m may be different. Further, the server 106 stores the threshold distances corresponding to each communication device 104.

To connect with the Wi-Fi network associated with the first wireless network identifier for a first time, the user of the user device 102a inputs the first password. Subsequently, the communication devices 104a-104m create the Wi-Fi network with the first wireless network identifier and the first password for the user device 102a thereby allowing automatic connection to the Wi-Fi network. Similarly, for the multiple user devices 102a-102n, wireless network identifiers and passwords are created for automatic Wi-Fi connections. Thus, the system 100 provides a seamless and hassle-free Wi-Fi connectivity to the user devices 102a-102n. Additionally, the server 106 ensures that the Wi-Fi network is created only when the user devices 102a-102n are located within the threshold distances of the communication devices 104a-104m. When the user devices 102a-102n traverse beyond the threshold distances of the communication devices 104a-104m, the server 106 instructs the communication devices 104a-104m to disconnect the Wi-Fi network. Alternatively, the disconnecting may also be done using chauffer initiated trigger, or when a request for booking the same taxi is received from another user device. Thus, the system 100 provides efficient control over the wireless networks created by the communication devices 104a-104m. As the server 106 stores the set of wireless network identifiers and the set of passwords corresponding to the set of device identifiers, the creation of the wireless networks by the communication devices 104a-104m is managed effectively. Further, usage of the wireless networks is regulated by the server 106 by storing timestamps corresponding to creation of the wireless networks and packet data downloads and/or uploads.

Figure 4:
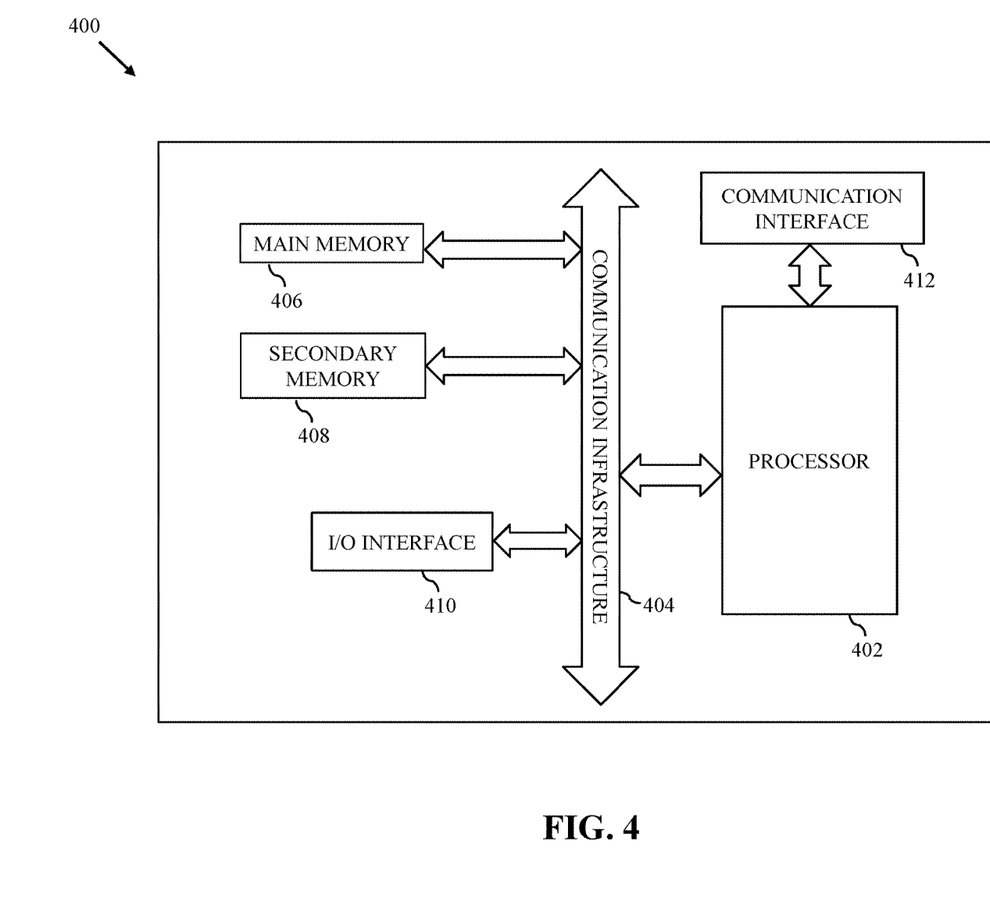
FIG. 4 illustrates a computer system for creating and managing the wireless network of FIG. 1 according to an embodiment of the present invention.

FIG. 4 is a block diagram that illustrates a computer system 400 for creating and managing the wireless networks, in accordance with an embodiment of the present invention. An embodiment of present invention, or portions thereof, may be implemented as computer readable code on the computer system 400. In one example, the server 106, the user devices 102, and the communication devices 104 of FIG. 1 may be implemented using the computer system 400. Further, the computer system 400 may be realized in the form of a personal computer, a laptop, a server, a tablet, a PDA, a cellular telephone, a server, or any machine that is capable of executing a set of computer instructions that are to be executed by the computer system 400.

The computer system 400 includes a processor 402 that may be a special purpose or a general purpose processing device. The processor 402 may correspond to a single processor, a plurality of processors, or combinations thereof. The processor 402 may have one or more processor "cores." Further, the processor 402 may be connected to a communication infrastructure 404, such as a bus, a bridge, a message queue, a network, i.e., the network 108, multi-core message-passing scheme, and the like. The computer system 400 further includes a main memory 406 and a secondary memory 408. Examples of the main memory 406 may include RAM, ROM, PROM, EPROM, and the like. The secondary memory 408 may include a hard disk drive or a removable storage drive, such as a floppy disk drive, a magnetic tape drive, an optical disk drive, a flash memory, and the like. Further, the removable storage drive may read from and/or write to a removable storage device in a well-known manner. In one embodiment, the removable storage device may be a non-transitory computer readable recording media.

The computer system 400 further includes an input/output (I/O) interface 410 and a communication interface 412. The I/O interface 410 includes various input and output devices that are configured to communicate with the processor 402. Examples of the input devices may include a keyboard, a mouse, a joystick, a touchscreen, a microphone, and the like. Examples of the output devices may include a display screen, a speaker, headphones, and the like. The communication interface 412 may allow data to be transferred between the computer system 400 and various external devices. Exemplary communication interfaces 412 may include a modem, a network interface, i.e., an Ethernet card, a communications port, and the like. Data transferred via the communication interface 412 may be in the form of signals, which may be electronic, electromagnetic, optical, or other signals as will be apparent to persons having skill in the relevant art. The signals may travel via a communication channel (not shown) which may be configured to carry the signals and may be implemented using wire, cable, fiber optics, a phone line, a cellular phone link, a radio frequency link, and the like.

Computer program medium and computer usable medium may refer to memories, such as the main memory 406 and the secondary memory 408, which may be memory semiconductors, such as dynamic RAMs. These computer program products may be means for providing data to the computer system 400 that enable computer system 400 to implement the methods illustrated by FIGS. 2 and 3, as discussed herein. In one embodiment, the present invention is implemented using a computer implemented application, the computer implemented application may be stored in a computer program product and loaded into the computer system 400 using the removable storage drive or the hard disc drive in the secondary memory 408, the I/O interface 410, or the communication interface 412.

A person having ordinary skill in the art will appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor such as the processor 402 and a memory such as the main memory 406 and the secondary memory 408 may be used to implement the above described embodiments. Further, the operations may be described as a sequential process, however some of the operations may in fact be performed in parallel, concurrently, and/or in a distributed environment, and with program code stored locally or remotely for access by single or multiprocessor machines. In addition, in some embodiments the order of operations may be rearranged without deviating from the scope of present invention.

While various embodiments of the present invention have been illustrated and described, it will be clear that the present invention is not limited to these embodiments only. Numerous modifications, changes, variations, substitutions, and equivalents will be apparent to those skilled in the art, without departing from the spirit and scope of the present invention, as described in the claims.

The invention claimed is:

1. A method for creating a wireless network, the method comprising:
   transmitting, by at least one of a first communication device and a user device, a first device identifier to a server;
   receiving a first wireless network identifier by the first communication device from the server, wherein the first wireless network identifier is associated with the first device identifier of the user device and is generated by the server based on the first device identifier;
   receiving a first password by the first communication device from the server, wherein the first password is associated with at least one of the first wireless network identifier and the first device identifier of the user device and is generated by the server based on the first device identifier;
   creating the wireless network by the first communication device based on at least the first wireless network identifier and the first password, whereby the user device connects to the wireless network using the first wireless network identifier and the first password;
   receiving the first wireless network identifier and the first password from the server by a second communication device, wherein the server receives the first device identifier of the user device from at least one of the second communication device and the user device, and transmits the first wireless network identifier and the first password to the second communication device based on the first device identifier of the user device; and
   re-creating the wireless network by the second communication device based on the first wireless network identifier and the first password, after the wireless network created by the first communication device is disconnected, whereby the user device re-connects to the wireless network created by the second communication device using the first wireless network identifier and the first password.

2. The method of claim 1, wherein the wireless network is a Wi-Fi network, wherein the first wireless network identifier is a service set identifier (SSID) of the Wi-Fi network, and wherein the user device is at least one of a mobile device, a cellular phone, a tablet, and a laptop.

3. A method for creating a wireless network, the method comprising:
   receiving a first device identifier from at least one of a user device and a first communication device by a server, wherein the first device identifier is associated with the user device;

generating a first wireless network identifier and a first password by the server based on the first device identifier associated with the user device;

transmitting the first wireless network identifier and the first password to the first communication device by the server;

instructing the first communication device to create the wireless network based on at least the first wireless network identifier and the first password by the server, whereby the user device connects to the wireless network using the first wireless network identifier and the first password stored in a memory of the user device;

receiving the first device identifier from at least one of the user device and a second communication device by the server;

transmitting the first wireless network identifier and the first password to the second communication device by the server; and instructing the second communication device to re-create the wireless network based on the first wireless network identifier and the first password, after the wireless network created by the first communication device is disconnected, whereby the user device re-connects to the wireless network created by the second communication device using the first wireless network identifier and the first password stored in the memory of the user device.

4. The method of claim 3, wherein the wireless network is a Wi-Fi network, wherein the first wireless network identifier is a service set identifier (SSID) of the Wi-Fi network, and wherein the user device is at least one of a mobile device, a cellular phone, a tablet, and a laptop.

5. A system for creating a wireless network, the system comprising:

a server, wherein the server is configured to:

receive a first device identifier from a user device, wherein the first device identifier is associated with the user device; and generate a first wireless network identifier and a first password based on the first device identifier, such that the first wireless network identifier and the first password are associated with the first device identifier associated with the user device; and a first communication device, wherein the first communication device is configured to:

receive the first wireless network identifier and the first password from the server; and create the wireless network based on at least the first wireless network identifier and the first password, whereby the user device connects to the wireless network using the first wireless network identifier and the first password stored in a memory of the user device, wherein the server is further configured to:

receive the first device identifier from at least one of a second communication device and the user device;

transmit the first wireless network identifier and the first password to the second communication device based on the reception of the first device identifier associated with the user device; and instruct the second communication device to re-create the wireless network based on the first wireless network identifier and the first password, after the wireless network created by the first communication device is disconnected, whereby the user device connects to the wireless network created by the second communication device using the first wireless network identifier and the first password stored in the memory of the user device.

6. The system of claim 5, wherein the wireless network is a Wi-Fi network, wherein the first wireless network identifier is a service set identifier (SSID) of the Wi-Fi network, and wherein the user device is at least one of a mobile device, a cellular phone, a tablet, and a laptop.

7. The method of claim 1, wherein the first and second communication devices are associated with two different vehicles.

* * * * *